(12) United States Patent
Zhang et al.

(10) Patent No.: US 10,830,286 B2
(45) Date of Patent: Nov. 10, 2020

(54) TRANSMISSION CLUTCH WITH PASSIVE, SPEED-BASED FLUID DISTRIBUTION

(71) Applicant: Ford Global Technologies, LLC, Dearborn, MI (US)

(72) Inventors: Dengfu Zhang, Northville, MI (US); David Beck, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 16/038,466

(22) Filed: Jul. 18, 2018

(65) Prior Publication Data
US 2020/0025264 A1   Jan. 23, 2020

(51) Int. Cl.
| | |
|---|---|
| *F16D 13/74* | (2006.01) |
| *F16D 13/52* | (2006.01) |
| *F16D 13/64* | (2006.01) |
| *F16D 25/12* | (2006.01) |
| *F16H 45/02* | (2006.01) |

(52) U.S. Cl.
CPC .............. *F16D 13/74* (2013.01); *F16D 13/52* (2013.01); *F16D 13/644* (2013.01); *F16D 13/648* (2013.01); *F16D 25/123* (2013.01); *F16D 2300/0214* (2013.01); *F16D 2300/06* (2013.01); *F16H 2045/0215* (2013.01)

(58) Field of Classification Search
CPC ........ F16D 13/74; F16D 13/52; F16D 13/644; F16D 13/648; F16D 2300/0214; F16D 25/123; F16D 2300/06; F16D 13/72; F16H 2045/0215; F16H 57/0427; F16H 57/0473
See application file for complete search history.

(56) References Cited

U.S. PATENT DOCUMENTS

| | | | |
|---|---|---|---|
| 4,413,716 A | * | 11/1983 | Newsome ............... F16D 13/72 |
| | | | 192/70.12 |
| 5,090,527 A | | 2/1992 | Imamura et al. |
| 5,988,335 A | | 11/1999 | Kupferschmid et al. |
| 6,244,407 B1 | | 6/2001 | Kremer et al. |
| 8,863,923 B2 | | 10/2014 | Kaneko et al. |
| 9,046,139 B2 | | 6/2015 | Meyer et al. |
| 9,091,305 B2 | | 7/2015 | Penz et al. |

(Continued)

FOREIGN PATENT DOCUMENTS

| | | | |
|---|---|---|---|
| DE | 4136040 | * | 11/1991 |
| JP | WO2007/142366 | * | 12/2007 |

*Primary Examiner* — Mark A Manley
(74) *Attorney, Agent, or Firm* — Vincent Mastrogiacomo; Brooks Kushman P.C.

(57) ABSTRACT

A transmission includes a clutch configured to selectively couple a clutch hub to a clutch housing. The clutch hub includes a channel to provide oil from a central passageway to remove heat from a clutch pack. The oil runs along a disk of the clutch hub to a perforated annular ring of the clutch hub, then through the perforations to the clutch pack. An oil deflector limits the flow of oil at low clutch hub speeds. The deflector is mounted to the clutch hub disk to create a flow restriction. At low speeds, the oil builds up in a reservoir radially inside the restriction and then spills over a dam and is directed away from the clutch pack by a conical surface. The reduced oil flow at low speeds reduces parasitic loss. At higher speeds, centrifugal forces increase the flow rate.

13 Claims, 2 Drawing Sheets

(56) References Cited

U.S. PATENT DOCUMENTS

| | | | |
|---|---|---|---|
| 2008/0121488 A1* | 5/2008 | Miyazaki | F16D 25/0638 192/70.12 |
| 2010/0065395 A1* | 3/2010 | Baer | F16D 13/52 192/70.2 |
| 2013/0213740 A1* | 8/2013 | Tanaka | F16H 57/043 184/6.12 |
| 2017/0009817 A1 | 1/2017 | Ohno et al. | |
| 2017/0261094 A1* | 9/2017 | Kishimoto | F16D 13/74 |
| 2018/0180113 A1* | 6/2018 | Tokito | F16D 13/74 |

* cited by examiner

TRANSMISSION CLUTCH WITH PASSIVE, SPEED-BASED FLUID DISTRIBUTION

TECHNICAL FIELD

This disclosure relates to the field of transmissions for motor vehicles. More particularly, the disclosure pertains to a transmission clutch hub with passive, speed based lubrication control.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many transmissions utilize friction clutches and brakes which are engaged in different combinations to establish different power flow paths having different speed ratios. One type of commonly used friction clutch is a wet multi-plate clutch. A clutch pack includes a set of friction plates splined to one component and interleaved with a set of separator plates splined to a different component. To engage the clutch, pressurized fluid is supplied to an apply chamber forcing a piston to squeeze the friction plates between the separator plates. Friction between the friction plates and separator plates prevents relative rotation, thereby coupling the two components to each other. When the fluid pressure is reduced, a return spring forces the piston away from the clutch pack removing the normal force such that relative rotation is possible with minimal drag. Wet multi-plate clutches rely on a supply of transmission fluid to the friction material on the friction plates. This fluid serves several purposes, including modifying the friction characteristics of the material and removing excess heat.

SUMMARY OF THE DISCLOSURE

A transmission includes a clutch hub and an oil deflector. The clutch hub is supported for rotation about an axis and has a disk supporting a perforated annular rim. The oil deflector is mounted to the hub to define an oil flow channel between the deflector and the disk. A reservoir is defined radially inside the channel. The oil deflector has a cone shaped extension to direct oil overflowing the reservoir away from the annular rim. The clutch hub may define an oil feed passageway radially inside the reservoir. A plurality of friction plates may be splined to the annular rim. A plurality of separator plates may be splined to a clutch housing and interleaved with the friction plates. The clutch housing may also be supported for rotation about the axis. A piston may be supported to translate with respect to the clutch housing to squeeze the friction plates between the separator plates. The hub may rotate about a central shaft. The central shaft may define an axial channel configured to deliver fluid to the clutch.

A transmission clutch hub includes a disk, a perforated annular rim, and an oil deflector. The annular rim is supported radially outside the disk. The oil deflector is mounted to the disk to define an oil flow channel between the deflector and the disk. A reservoir is defined radially inside the channel. The oil deflector has a cone shaped extension to direct oil overflowing the reservoir away from the annular rim. The clutch hub may define an oil feed passageway radially inside the reservoir.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
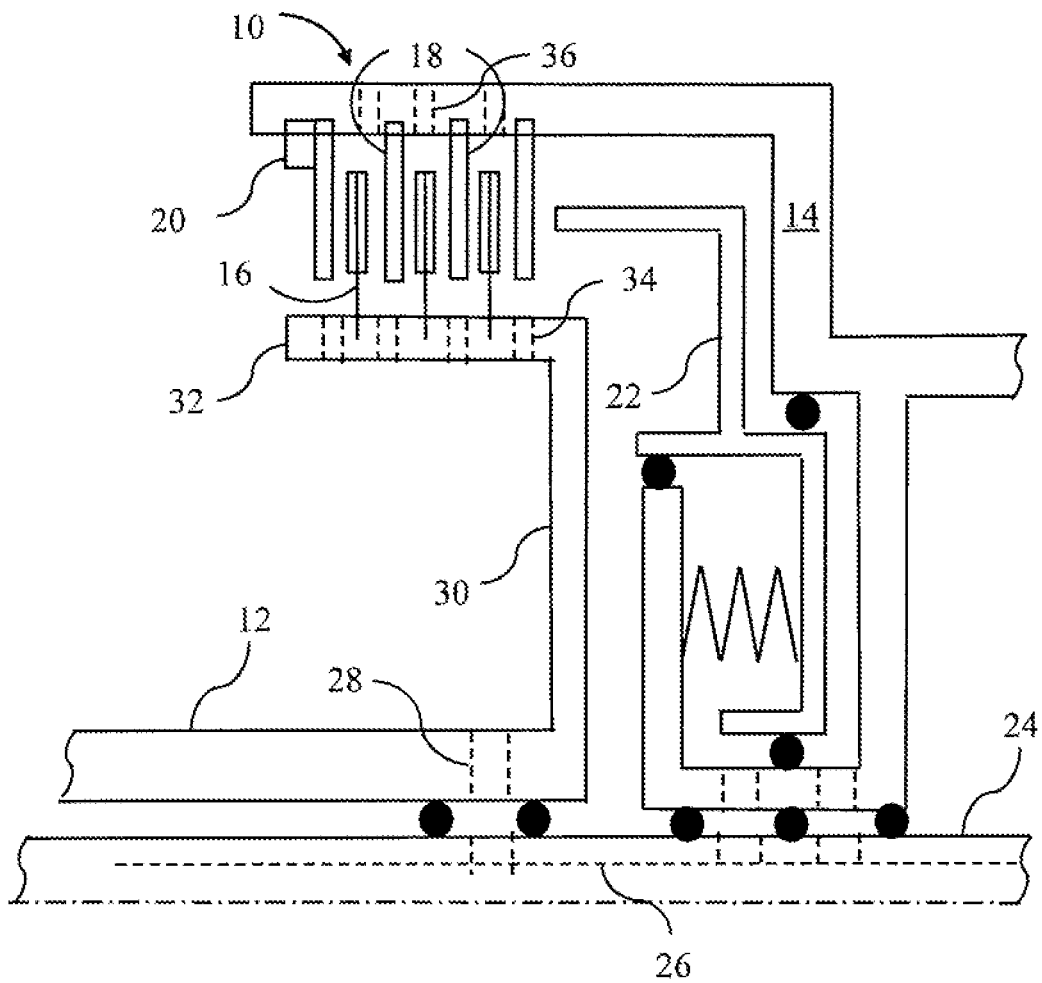
FIG. 1 is a cross section of a transmission clutch.

FIG. 1 is a cross section of a transmission clutch 10. Clutch 10 selectively couples two rotating transmission elements to one another. A hub 12 is fixed to one of the rotating elements and a clutch housing 14 is fixed to the other rotating element. In other embodiments, the clutch housing may be non-rotating. A plurality of friction plates 16 are splined to clutch hub 12 and interleaved with a plurality of separator plates 18 splined to clutch housing 14. The leftmost separator plate, which is called a reaction plate, is constrained axially by snap ring 20. Piston 22 slides axially with respect to clutch housing 14 in response to fluid pressure to squeeze friction plates 16 between separator plates 18. Friction between the separator plates and the friction plates causes the transmission of torque between the clutch hub 12 and the clutch housing 14. When clutch 10 is fully engaged, clutch hub 12 and clutch housing 14 rotate together as a single unit. During a transition from disengaged to engaged, a considerable amount of heat is generated. The separator plates absorb the majority of this heat by increasing in temperature. When the fluid pressure is released, a return spring pushes piston away from the separator plates and friction plates relieving the normal force. In the released state, the clutch hub and clutch housing are free to rotate at different speeds from one another. Ideally, no torque would be transmitted in the released state. In practice, some parasitic drag remains.

In the illustrated embodiment, both clutch hub 12 and clutch housing 14 rotate about a central shaft 24. Fluid is supplied for a variety of purposes through various axial channels 26 in central shaft 24. One of these channels conveys pressurized fluid which is pressurized when the clutch is to be engaged. Another channel conveys fluid at low pressure for lubrication and heat removal. The fluid is routed to either the clutch hub 12 or the clutch housing via radial holes and seals. In other embodiments, either clutch hub 12 or clutch housing 14 may be fixed to the central shaft thus eliminating the need to route fluid between components. The lubrication channel in the input shaft supplies fluid to a radial channel 28 in clutch hub 12. Clutch hub 12 includes a disk 30 and an annular rim 32. The friction plates 16 are splined to the annular rim 32. Propelled by centrifugal forces, fluid exiting channel 28 tends to flow along the side of disk 30 and then spread out along the inner surface of annular rim 32. A number of holes 34 in the annular rim permit the fluid to flow into the area between the friction plates and the separator plates. As the fluid flows past the separator plates, it absorbs heat, cooling the separator plates. Then, the fluid flows out of holes 36 in the clutch housing and drips back to the transmission sump.

The rate of fluid flow into the clutch hub is determined by an intentional flow restriction, such as an orifice in channel 28 sized to limit flow to a desired flow level when the pressure is set to a given level in the valve body. The desired flow level is based on worst-case cooling and lubrication requirements. The worst-case requirements tend to occur at higher shaft speeds for two reasons. First, the energy absorbed by the separator plates during a shift is highest when the relative speed between clutch hub 12 and clutch housing 14 is highest. Although the ratio of the speeds of the hub and the housing varies among gear ratios, the speed difference tends to be highest when the absolute speeds are also the highest. Second, due to centrifugal forces on the fluid, the fluid is expelled from the clutch more quickly when the hub is rotating at high speed. Since the fluid spends less time in contact with the separator plates, a higher flow rate may be required to remove heat at a given rate.

Figure 2:
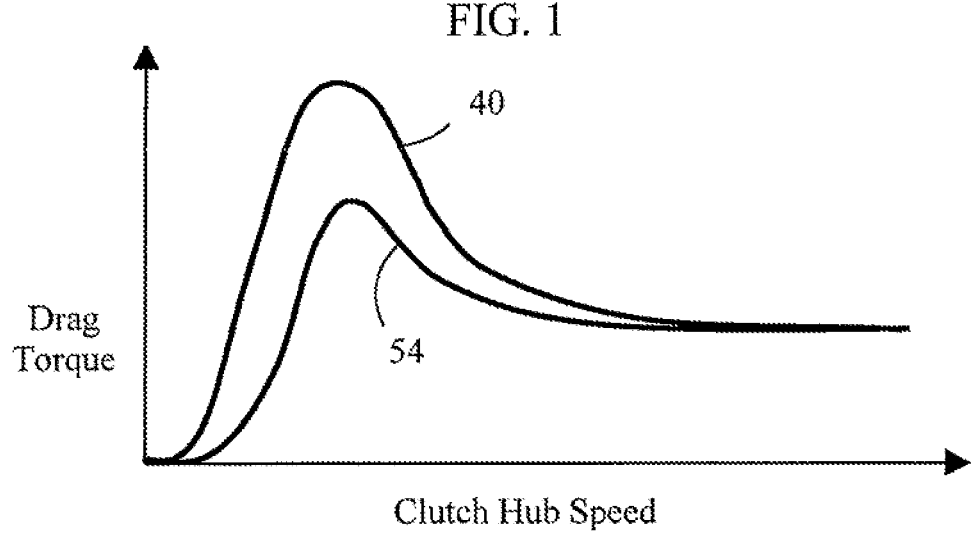
FIG. 2 is a graph of clutch drag torque versus hub speed.

FIG. 2 illustrates the impact of clutch hub speed on clutch drag for a particular gear ratio (clutch housing speed is proportional to clutch hub speed for a particular gear ratio). Line 40 represents the drag torque for clutch 10 as a function of clutch hub speed. At very low speeds, the drag is low because the relative velocity of the friction plates and separator plates is very low. As clutch hub speed increases, the viscous drag forces increase nearly proportionally up to a point. As the clutch hub speed further increases, the increased centrifugal forces cause the fluid to flow out of the clutch housing more rapidly such that the space between the friction plates and separator plates is partially evacuated. The drag torque reaches a peak and then declines as the effect of fluid evacuation becomes more important than the effect of greater relative speed. At high speed, the drag torque levels off to a high-speed level.

Figure 3:
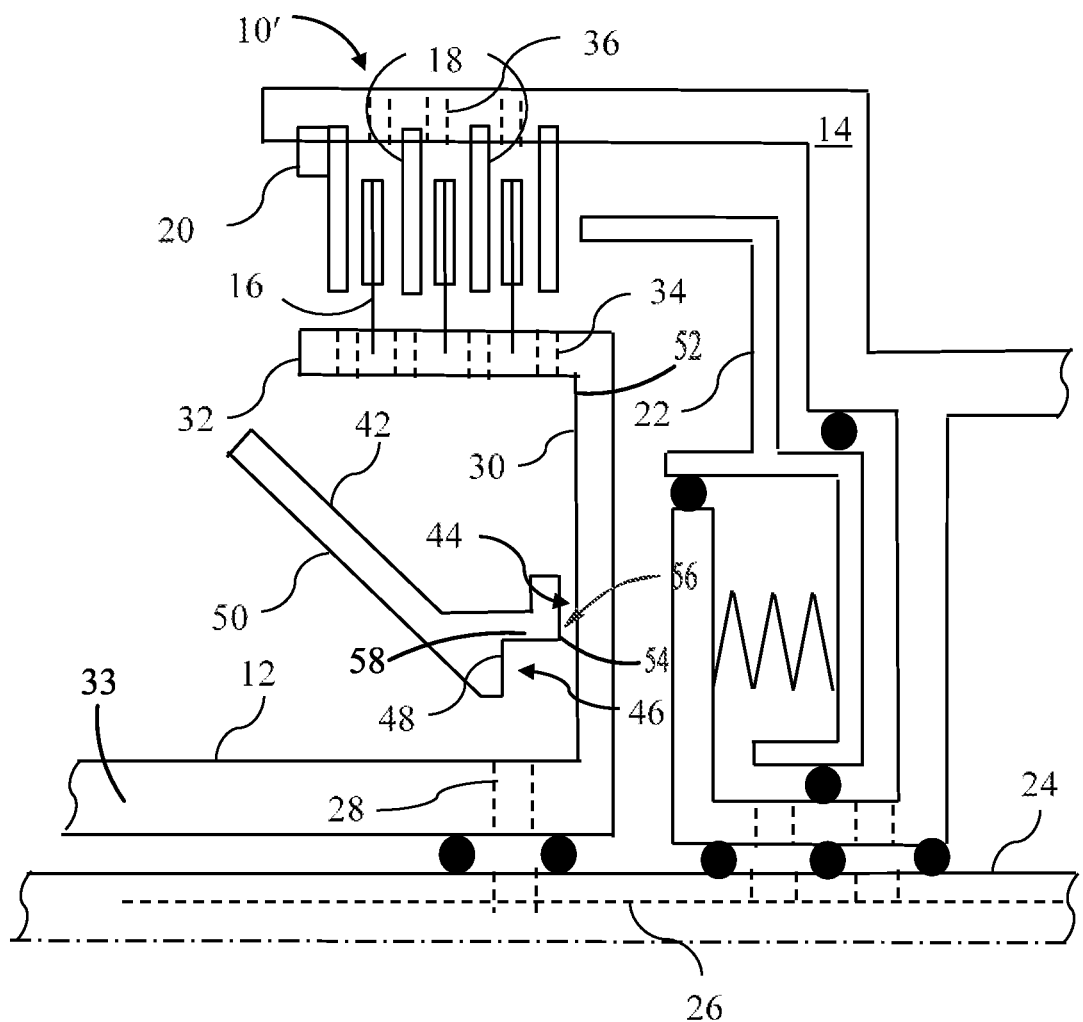
FIG. 3 is a cross section of the transmission clutch of FIG. 1 with an oil deflector installed to reduce parasitic drag at low speeds.

FIG. 3 illustrates a modified clutch hub design to reduce the parasitic drag, especially at low hub speeds. An oil deflector 42 is fixed to the clutch hub (at a different circumferential location than illustrated in FIG. 3). The oil deflector 42 is radially disposed between the outer annulus (annular rim) 32 and the inner annulus 33. The oil deflector 42 circumscribes the orifice 28 to control (limit) the flow of fluid (oil) from the orifice 28 to the holes 34. The deflector 42 forces the fluid bound for the holes 34 to travel between an oil-carry surface 52 of the disk 30 and end face 54 of the deflector 42. As fluid runs along the surface 52 of the clutch hub, it encounters a restriction 44, which may be in the form of a channel 56 defined between the end face 54 and the disk 30. The fluid is propelled through the restriction by centrifugal force. However, at low hub speeds, the centrifugal forces are not sufficient to propel the fluid through the restriction 44 at the same rate as it flows from orifice 28. Therefore, the fluid builds up on a backside of the deflector 42. The deflector 42 may define a reservoir 46 that collects the pooling fluid. The reservoir 46 may be defined by a radially extending dam 48 and a circumferential surface 58 that extends axially from the dam 48 to the end face 54. The fluid that spills over dam 48 is directed away from the clutch by conical surface 50 of the oil deflector.

Figure 4:
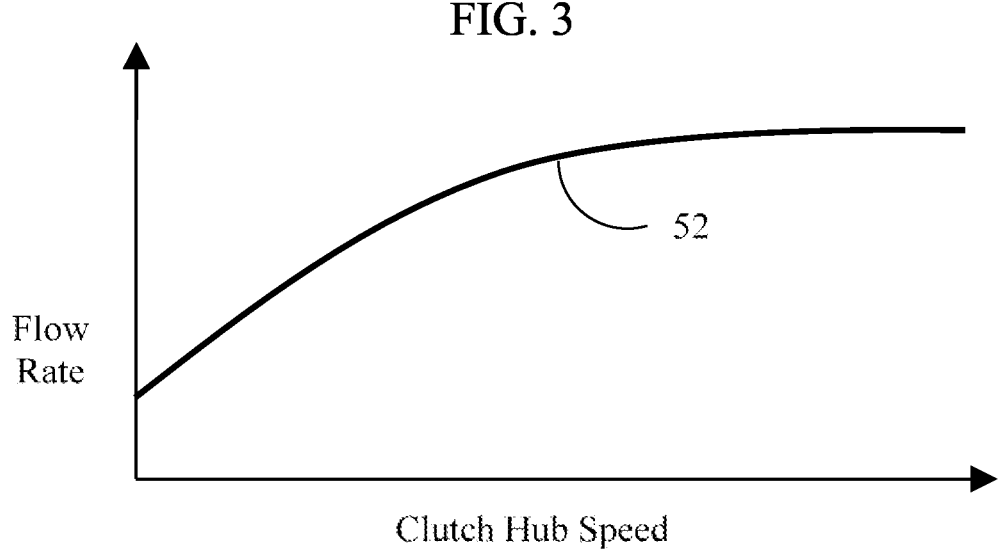
FIG. 4 is a graph of oil flow rate versus speed for the clutch with oil deflector of FIG. 3.

Line 52 of FIG. 4 illustrates the resulting flow rate through the clutch pack. As a result, the parasitic drag is reduced as illustrated by line 54 of FIG. 2.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission clutch comprising:
   a clutch hub including a disk having a radially inner end, a radially outer end, and a fluid-carrying surface extending between the inner and outer ends, the clutch hub further including an annular rim extending axially from the outer end and defining a plurality of perforations configured to receive fluid from the fluid-carrying surface;
   a fluid orifice circumscribed by the annular rim and positioned to supply the fluid to the fluid-carrying surface; and
   an oil deflector radially disposed between the annular rim and the fluid orifice and configured to control the flow of the fluid to the perforations, the deflector including:
   a restriction portion having an end face adjacent to the disk to define a channel between the end face and the fluid-carrying surface to restrict the flow of the fluid along the fluid-carrying surface,
   a dam portion cooperating with the restriction portion to define a reservoir radially inside the channel, wherein the reservoir, the channel, and fluid-carrying surface are in fluid communication and cooperate to form a fluid path configured to carry the fluid from the orifice to the perforations, and
   a conical surface extending from the dam portion and configured to direct oil overflowing the reservoir away from the annular rim.

2. The transmission clutch of claim 1 wherein the clutch hub defines the orifice.

3. The transmission clutch of claim 1 further comprising:
   a plurality of friction plates splined to the annular rim;
   a clutch housing; and a plurality of separator plates splined to the clutch housing and interleaved with the friction plates.

4. The transmission clutch of claim 3 further comprising a piston supported to translate with respect to the clutch housing to squeeze the friction plates between the separator plates.

5. A transmission clutch hub comprising:
an orifice;
a disk defining an oil-carrying surface;
an annular rim circumscribing the orifice and defining holes configured to receive oil from the oil-carrying surface; and
an oil deflector mounted to the disk and radially disposed between the orifice and the annular rim such that the oil deflector is spaced apart from the oil-carrying surface to define a channel between the deflector and the disk, the oil deflector including a dam portion cooperating with a restriction portion to define a reservoir radially inside the channel, wherein the deflector circumscribes the orifice, and the reservoir, the channel, and fluid-carrying surface are in fluid communication and cooperate to form a fluid path configured to carry the fluid from the orifice to the holes such that oil exiting the orifice must flow through the reservoir and the channel to reach the holes, wherein the oil deflector further includes a conical surface extending from the dam portion and configured to direct oil overflowing the reservoir away from the annular rim.

6. The transmission clutch hub of claim 5 further comprising an inner annulus connected to the disk and defining the orifice.

7. The transmission clutch hub of claim 5, wherein the deflector includes a radially extending end face spaced from the disk to define the channel and a circumferential surface extending axially from the end face.

8. The transmission clutch hub of claim 7, wherein the end face includes a radially inner edge and a radially outer edge, and the circumferential surface extends from the inner edge.

9. A clutch assembly comprising:
a clutch housing;
a clutch hub including an inner annulus defining an orifice, an outer annulus circumscribing the inner annulus and defining holes, and a disk extending therebetween;
a multi-plate clutch pack including friction plates connected to one of the housing and the outer annulus and separator plates connected to the other of the housing and the outer annulus; and
an oil deflector rotatably coupled to the clutch hub and radially disposed between the inner and outer annuli, the oil deflector including:
a radially extending end face spaced from the disk to define a channel between the deflector and the disk, the end face including a radially inner edge and a radially outer edge, wherein the deflector circumscribes the orifice such that oil exiting the orifice must flow through the channel to reach the holes,
a circumferential surface extending axially from the inner edge of the end face, and
an annular dam extending radially inward from the circumferential surface, wherein the circumferential surface and the dam cooperate to define a reservoir radially inside the channel, wherein the reservoir and the channel are in fluid communication and cooperate to form a fluid path configured to carry the fluid from the orifice to the holes.

10. The clutch assembly of claim 9, wherein the oil deflector further defines a conical surface extending from the reservoir and configured to direct oil overflowing the reservoir away from the outer annulus.

11. The clutch assembly of claim 9, wherein the deflector further includes a conical surface configured to direct oil overflowing the reservoir away from the outer annulus.

12. The clutch assembly of claim 9, wherein the oil deflector is mounted to the clutch hub.

13. The clutch assembly of claim 9 further comprising a piston supported to translate with respect to the clutch housing to squeeze the friction plates between the separator plates.

* * * * *